US012619902B2

(12) United States Patent
Pallapolu et al.

(10) Patent No.: US 12,619,902 B2
(45) Date of Patent: May 5, 2026

(54) SYSTEM AND METHOD FOR IDENTIFYING AND RECTIFYING APPLICATION PROGRAM INTERFACE ERRORS USING QUANTUM COMPUTING

(71) Applicant: Bank of America Corporation, Charlotte, NC (US)

(72) Inventors: Kalyan Chakravarthy Pallapolu, Hyderabad (IN); Gondi Mahesh, Hyderabad (IN); Gali Mohan Sreenivas, Tirupati (IN)

(73) Assignee: Bank of America Corporation, Charlotte, NC (US)

( * ) Notice: Subject to any disclaimer, the term of this patent is extended or adjusted under 35 U.S.C. 154(b) by 298 days.

(21) Appl. No.: 18/425,729

(22) Filed: Jan. 29, 2024

(65) Prior Publication Data
US 2025/0245544 A1 Jul. 31, 2025

(51) Int. Cl.
*G06N 10/60* (2022.01)
*G06F 11/36* (2025.01)
*G06N 10/70* (2022.01)
*H04L 67/02* (2022.01)

(52) U.S. Cl.
CPC .............. *G06N 10/70* (2022.01); *G06F 11/36* (2013.01); *G06N 10/60* (2022.01); *H04L 67/02* (2013.01)

(58) Field of Classification Search
None
See application file for complete search history.

(56) References Cited

U.S. PATENT DOCUMENTS

| | | | |
|---|---|---|---|
| 7,583,587 B2 | 9/2009 | Qiu et al. | |
| 8,869,103 B2 | 10/2014 | Conrad et al. | |
| 9,143,530 B2 | 9/2015 | Qureshi et al. | |
| 9,699,205 B2 | 7/2017 | Muddu et al. | |

(Continued)

FOREIGN PATENT DOCUMENTS

| | | | | |
|---|---|---|---|---|
| CN | 112214399 A | * 1/2021 | ............... | G06F 8/42 |
| EP | 3469524 B1 | 12/2023 | | |
| WO | 2022053732 A1 | 3/2022 | | |

OTHER PUBLICATIONS

Panagiotis Botsinis et al, "Quantum Error Correction Protects Quantum Search Algorithm Against Decoherence", Scientific Reports (Year: 2016).*

(Continued)

*Primary Examiner* — Lewis A Bullock, Jr.
*Assistant Examiner* — Mark A Gooray

(57) ABSTRACT

A method includes analyzing codes of a plurality of applications. Errors in the codes of the plurality of applications are identified based on a plurality of rules. An initial quantum state is generated and one or more iterations are performed on the initial quantum state to determine a final quantum state. Performing an iteration of the one or more iterations includes applying an oracle operator and a diffusion operator to the current quantum state. Based on the final quantum state, one or more APIs of the plurality of applications that correspond to the errors are determined. A first application corresponding to a first API of the one or more APIs is identified. A first code fix for a first code of the first application is determined. The first code fix is applied to the first code of the first application to determine a first fixed code of the first application.

20 Claims, 3 Drawing Sheets

(56)      References Cited

U.S. PATENT DOCUMENTS

| | | | |
|---|---|---|---|
| 9,734,169 B2 | 8/2017 | Redlich et al. | |
| 10,332,023 B2 | 6/2019 | Mezzacapo et al. | |
| 10,541,765 B1 | 1/2020 | O'Shea et al. | |
| 10,713,582 B2 | 7/2020 | Dadashikelayeh | |
| 11,151,526 B2 | 10/2021 | Haldenby et al. | |
| 11,562,278 B2 | 1/2023 | Ma et al. | |
| 11,699,002 B2 | 7/2023 | Haener et al. | |
| 2017/0214701 A1 | 7/2017 | Hasan | |
| 2019/0384762 A1 | 12/2019 | Hill et al. | |
| 2021/0295169 A1 | 9/2021 | Sikka et al. | |
| 2021/0342730 A1 | 11/2021 | Redmond et al. | |
| 2024/0419575 A1* | 12/2024 | Hawker | G06F 11/362 |
| 2025/0045148 A1* | 2/2025 | Acharya | G06F 11/079 |

OTHER PUBLICATIONS

En-Jui Kuo et al. ("Quantum Architecture Search via Deep Reinforcement Learning", aeXiv (Year: 2021).*

* cited by examiner

SYSTEM AND METHOD FOR IDENTIFYING AND RECTIFYING APPLICATION PROGRAM INTERFACE ERRORS USING QUANTUM COMPUTING

TECHNICAL FIELD

The present disclosure relates generally to code review and deployment, and more specifically to a system and method for identifying and rectifying application program interface errors using quantum computing.

BACKGROUND

Cloud computing systems include a plurality of computing systems, each of which hosts a plurality of applications. When new versions of the applications are to be deployed to a cloud computing system, one computing system and/or one application is analyzed at a time. Furthermore, code reviews for application programming interfaces (APIs) of the new versions of applications are done manually. Due to these limitations, turn-around time (TAT) of deployment for the new versions of the applications is delayed.

SUMMARY

The system described in the present disclosure provides several practical applications and technical advantages that overcome the current technical problems with code review and deployment.

In general, a system for identifying and rectifying application programming interface (API) errors includes a code review system operably coupled to a cloud computing system including a plurality of service provider systems and a test computing system via a network. Each service provider system is configured to host a plurality of applications. The code review system includes a classical processor and a quantum processor operably coupled to a memory. The memory is configured to store a plurality of rules for identifying errors in to be deployed codes of the applications and one or more quantum search algorithms, such as Grover's algorithm, for example.

In operation, the code review system receives a plurality of application codes. In certain embodiments, the plurality of application codes are application codes that are to be deployed to the service provider systems of the cloud computing system. The code review system analyzes the plurality of application codes and identifies errors in the plurality of application codes based on rules. The code review system implements a quantum algorithm (e.g., Grover's search algorithm) to determine APIs that correspond to the errors. The code review system initializes qubits and applies the Hadamard operator to the qubits to generate an initial quantum state. The code review system applies an oracle operator and a diffusion operator to the current quantum state. The code review system determines if the oracle and diffusion operators are applied to the initial quantum state for a threshold number of times. In certain embodiments, the oracle and diffusion operators are applied to the initial quantum state one or more times until the oracle and diffusion operators are applied to the initial quantum state for the threshold number of times. In response to determining that the oracle and diffusion operators are applied to the initial quantum state for the threshold number of times, the code review system identifies the current quantum state as a final quantum state and measures the final quantum state to determine the APIs that correspond to the errors.

The code review system identifies an application code corresponding to each API and determines a code fix corresponding to each identifies application code. The code review system applies code fixes to the identified application codes to generate fixed application codes. The code review system deploys the fixed application codes to a test system. The code review system analyzes the fixed application codes and determines if run-time errors are identified. In certain embodiments, the above-described operations may be repeated one or more times until the run-time errors are not identified. In response to determining that the run-time errors are not identified, the code review system deploys the fixed application codes to the service provider systems of the cloud computing system.

The system for identifying and rectifying application programming interface errors allows for an efficient code review for a plurality of applications hosted by a plurality of service provider systems of a cloud computing system. By using a quantum processor implementing a quantum search algorithm (e.g., Grover's search algorithm), speed of the code review process is increased due to quantum parallelism compared to classical algorithms executed by classical processors. This in turn reduces the overall turn-around time of deployment (TAT). Furthermore, by using quantum processors instead of classical processors, computing resources (e.g., memory, network bandwidth, etc.) that would be otherwise consumed by using the classical processors may be saved and used for other applications. Accordingly, the following disclosure is particularly integrated into practical applications of: (1) improving efficiency of a code review process; (2) improving speed of the code review process by using quantum processors that implement quantum algorithms; and (3) improving utilization of computing resources by using quantum processors instead of classical processors.

In one embodiment, a system includes a memory, and a classical processor and a quantum processor communicatively coupled to the memory. The memory is configured to store a quantum search algorithm and a plurality of rules. The plurality of rules are used to identify application programming interface (API) errors. The classical processor is configured to analyze codes of a plurality of applications. The plurality of applications are configured to be deployed to a plurality of computing systems. The classical processor is further configured to identify first errors in the codes of the plurality of applications based on the plurality of rules, receive, from the quantum processor, one or more APIs of the plurality of applications that correspond to the first errors, and identify a first application corresponding to a first API of the one or more APIs. The first application is configured to be deployed to a first computing system of the plurality of computing systems. The classical processor is further configured to determine a first code fix for a first code of the first application and apply the first code fix to the first code of the first application to determine a first fixed code of the first application. The quantum processor, when implementing the quantum search algorithm, is configured to initialize a first plurality of qubits, generate a first initial quantum state based on the first plurality of qubits, and perform one or more first iterations on the first initial quantum state to determine a first final quantum state. Performing an iteration of the one or more first iterations includes applying a first oracle operator to a first current quantum state and applying a first diffusion operator to the first current quantum state. The quantum processor is further configured to determine, based on the first final quantum state, the one or more APIs of the plurality of applications that correspond to the first errors.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
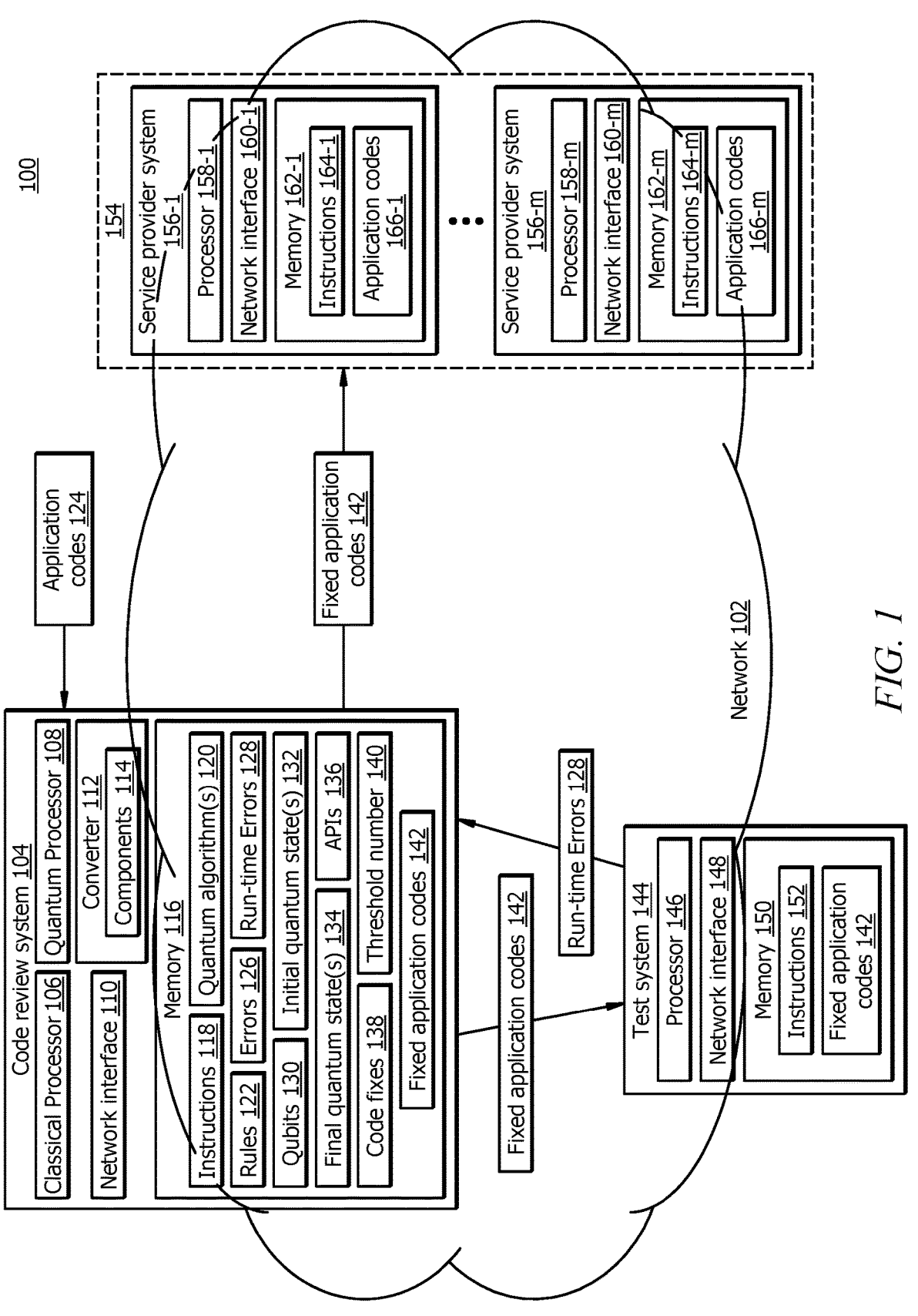
FIG. 1 illustrates an embodiment of a system for identifying and rectifying application programming interface errors using quantum computing.
Figure 2A:
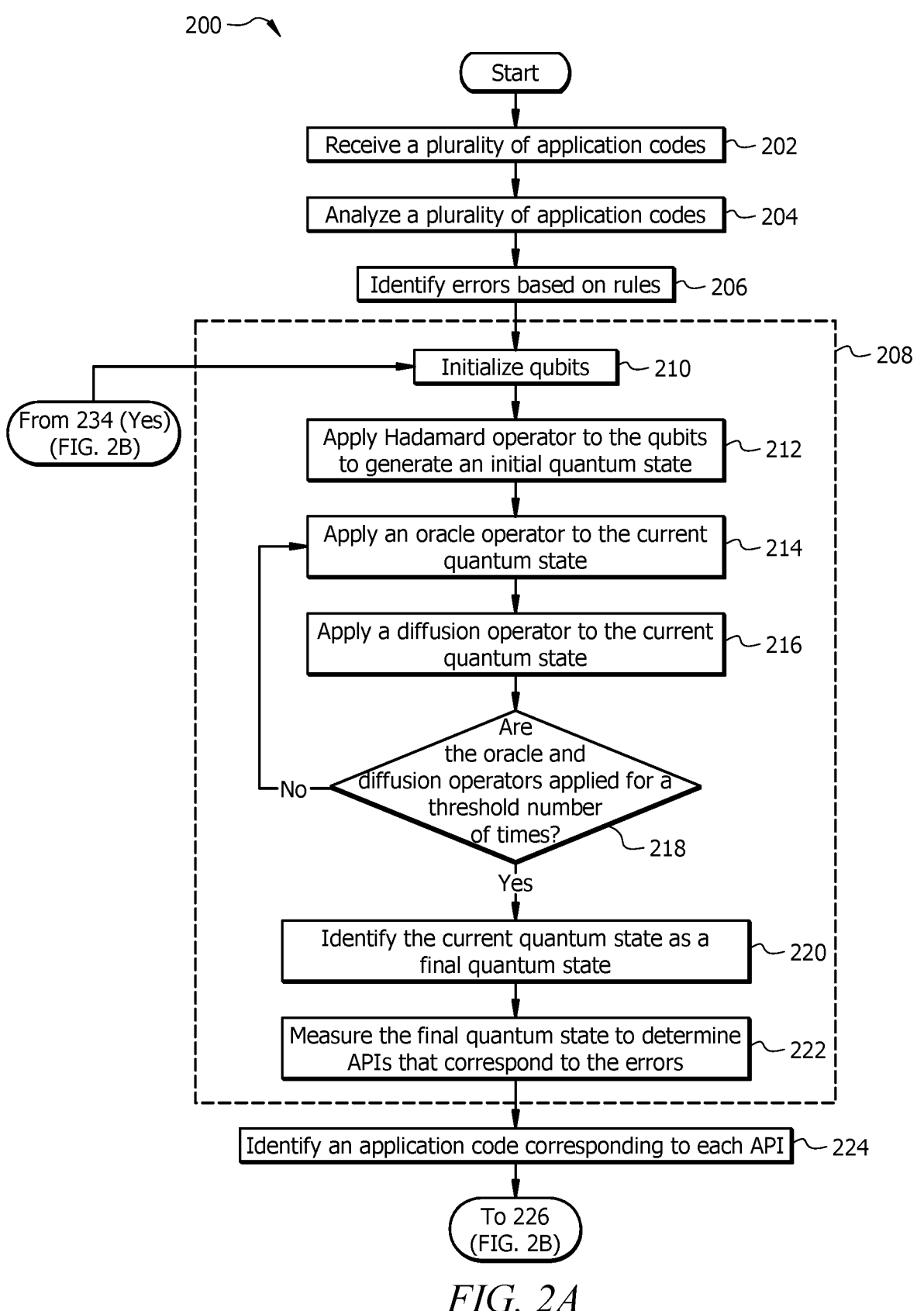
FIGS. 2A and 2B illustrate an example flowchart of a method performed by the system of FIG. 1 for identifying and rectifying application programming interface errors using quantum computing.
Figure 2B:
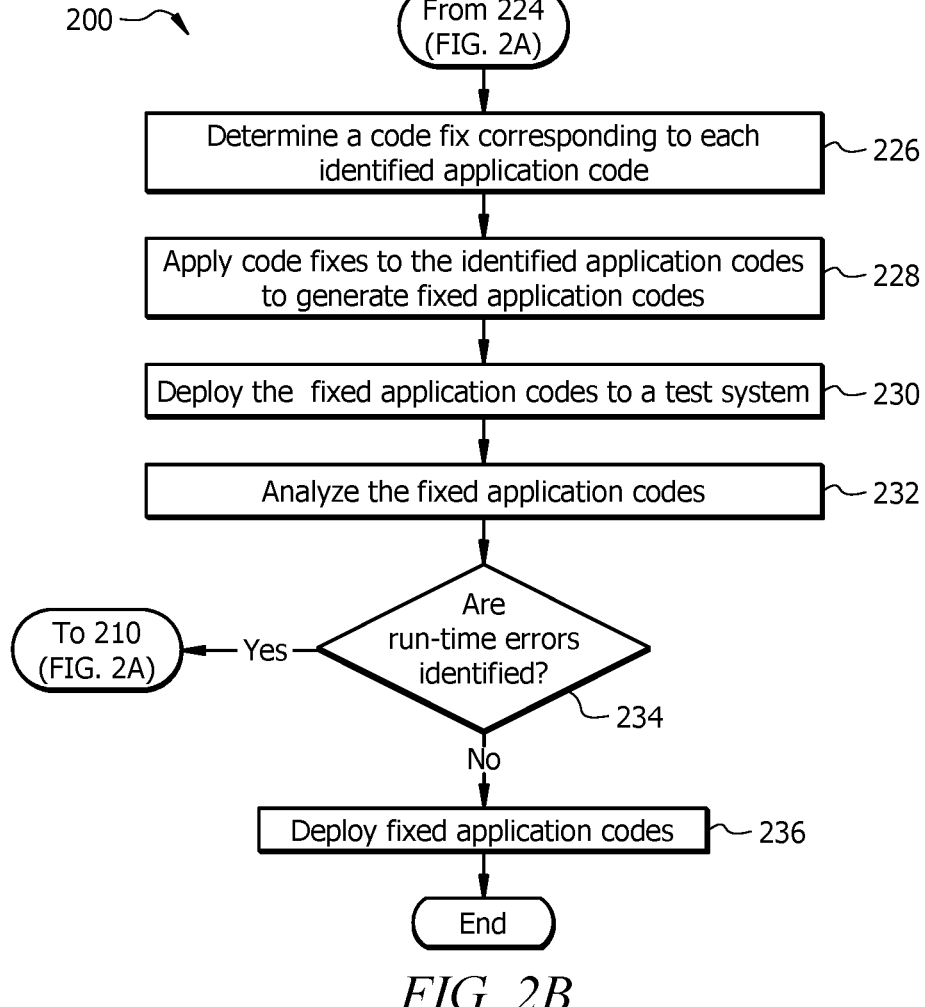

As described above, previous technologies fail to provide effective systems and methods for code review and deployment. Embodiments of the present disclosure and their advantages may be understood by referring to FIGS. 1, 2A, and 2B. FIGS. 1, 2A, and 2B are used to describe a system and method for identifying and rectifying application program interface errors using quantum computing.

System Overview

FIG. 1 illustrates an embodiment of a system 100 for identifying and rectifying application program interface errors using quantum computing. In certain embodiments, the system 100 comprises a code review system 104 operably coupled to a test system 144 and a cloud computing system 154 via a network 102. The cloud computing system 154 comprises a plurality of service provider systems 156-1 through 156-m. Network 102 enables the communication between the components of the system 100. The plurality of service provider systems 156-1 through 156-m are configured to provide various services to users. In other embodiments, the system 100 may not have all the components listed and/or may have other elements instead of, or in addition to, those listed above.

In general, the code review system 104 receives a plurality of application codes 124. In certain embodiments, the plurality of application codes 124 are application codes that are to be deployed to the service provider systems 156-1 through 156-m of the cloud computing system 154. The code review system 104 analyzes the plurality of application codes 124 and identifies errors 126 in the plurality of application codes 124 based on rules 122. The code review system 104 implements a quantum algorithm 120 (e.g., Grover's search algorithm) to determine APIs 136 that correspond to the errors 126. The code review system 104 initializes qubits 130 and applies the Hadamard operator to the qubits 130 to generate an initial quantum state 132. The code review system 104 applies an oracle operator and a diffusion operator to the current quantum state (e.g., initial quantum state 132). In certain embodiments, the oracle operator comprises a Pauli X gate. The code review system 104 determines if the oracle and diffusion operators are applied to the initial quantum state 132 for a threshold number 140 of times. In certain embodiments, the oracle and diffusion operators are applied to the initial quantum state 132 one or more times until the oracle and diffusion operators are applied to the initial quantum state 132 for the threshold number 140 of times. In response to determining that the oracle and diffusion operators are applied to the initial quantum state 132 for the threshold number 140 of times, the code review system 104 identifies the current quantum state as a final quantum state 134 and measures the final quantum state 134 to determine APIs 136 that correspond to the errors 126.

The code review system 104 identifies an application code (e.g., respective one of the plurality of application codes 124) corresponding to each API (e.g., respective one of the APIs 136) and determines a code fix (e.g., respective one of code fixes 138) corresponding to each identifies application code (e.g., respective one of the plurality of application codes 124). The code review system 104 applies code fixes 138 to the identified application codes (e.g., respective ones of the plurality of application codes 124) to generate fixed application codes 142. The code review system 104 deploys the fixed application codes 142 to a test system 144. The code review system 104 analyzes the fixed application codes 142 and determines if run-time errors 128 are identified. In certain embodiments, the above-described operations may be repeated one or more times until the run-time errors 128 are not identified. In response to determining that the run-time errors 128 are not identified, the code review system 104 deploys the fixed application codes 142 to the service provider systems 156-1 through 156-m of the cloud computing system 154.

System Components

Network

Network 102 may be any suitable type of wireless and/or wired network. The network 102 may or may not be connected to the Internet or public network. Network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. Network 102 may be configured to support any suitable type of communication protocol as would be appreciated by one of ordinary skill in the art.

Code Review System

The code review system 104 is generally any device that is configured to process data and communicate with other components of the system 100 via the network 102. The code review system 104 may comprise a classical processor 106, a quantum processor 108, and a converter 112 in signal communication with a memory 116 and a network interface 110.

Classical processor 106 comprises one or more processors operably coupled to the memory 116. Classical processor 106 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Classical processor 106 may be a programmable logic device, a microcontroller, a microprocessor, or any suitable combination of the preceding. The one or more processors are configured to process data and may be implemented in hardware or software. For example, classical processor 106 may be 8-bit, 16-bit, 32-bit, 64-bit, or of any other suitable architecture. The one or more processors are configured to implement various software instructions to perform the operations described herein. For example, the one or more processors are configured to execute software instructions 118 and perform one or more functions described herein.

Quantum processor 108 may comprise one or more quantum processors operably coupled to the memory 116. Quantum processor 108 is configured to process quantum bits. Quantum processor 108 may comprise a superconducting quantum device (with qubits implemented by states of Josephson junctions), a trapped ion device (with qubits implemented by internal states of trapped ions), a trapped neutral atom device (with qubits implemented by internal states of trapped neutral atoms), a photon-based device (with qubits implemented by modes of photons), or any other suitable device that implements quantum bits with states of a respective quantum system. Quantum processor 108 is configured to execute one or more quantum algorithms 120 to perform one or more functions described herein.

Converter 112 is configured to convert data items represented by classical binary bits to quantum bits. Converter 112 is further configured to convert data items represented by quantum bits to classical binary bits. In certain embodiments, the converter 112 comprises a plurality of components 114 that are configured to generate and manipulate quantum bits. In the illustrated embodiment, the plurality of components 114 and the quantum processor 108 are configured to operate on a same type of quantum bits. For example, when the quantum processor 108 comprises a photon-based device (with qubits implemented by modes of photons), the plurality of components 114 may comprise optical components such as lasers, mirrors, prisms, waveguides, interferometers, optical fibers, filters, polarizers, and/or lenses.

Network interface 110 is configured to enable wired and/or wireless communications (e.g., via network 102). Network interface 110 is configured to communicate data between the code review system 104 and other components of the system 100. For example, the network interface 110 may comprise a WIFI interface, a local area network (LAN) interface, a wide area network (WAN) interface, a modem, a switch, or a router. The classical processor 106 and the quantum processor 108 are configured to send and receive data using the network interface 110. Network interface 110 may be configured to use any suitable type of communication protocol as would be appreciated by one of ordinary skill in the art.

Memory 116 comprises a non-transitory computer-readable medium such as one or more disks, tape drives, or solid-state drives, and may be used as an over-flow data storage device, to store programs when such programs are selected for execution, and to store instructions and data that are read during program execution. Memory 116 may be volatile or non-volatile and may comprise a read-only memory (ROM), random-access memory (RAM), ternary content-addressable memory (TCAM), dynamic random-access memory (DRAM), and static random-access memory (SRAM). Memory 116 may be implemented using one or more disks, tape drives, solid-state drives, and/or the like. Memory 116 may store any of the information described in FIGS. 1, 2A, and 2B along with any other data, instructions, logic, rules, or code operable to implement the function(s) described herein. The memory 116 is operable to store software instructions 118, the one or more quantum algorithms 120, and/or any other data and instructions. The software instructions 118 may comprise any suitable set of software instructions, logic, rules, or code operable to be executed by the classical processor 106. The one or more quantum algorithms 120 may comprise any suitable set of software instructions, logic, rules, or code operable to be executed by the quantum processor 108. In certain embodiments, the one or more quantum algorithms 120 may comprise Grover's search algorithm.

In operation, the classical processor 106 of a code review system 104 receives a plurality of application codes 124. In certain embodiments, the plurality of application codes 124 are application codes that are to be deployed to the service provider systems 156-1 through 156-m of the cloud computing system 154. The classical processor 106 of the code review system 104 analyzes the plurality of application codes 124 and identifies errors 126 in the plurality of application codes 124 based on rules 122. The rules 122 may comprise common rules (e.g., rules that are common across all service provider systems 156-1 through 156-m of the cloud computing system 154), custom rules (e.g., rules that are specific to each of the service provider systems 156-1 through 156-m of the cloud computing system 154), application specific rules (e.g., .NET rules, Mulesoft rules, Salesforce rules, or the like), or the like.

The quantum processor 108 of the code review system 104 implements a quantum algorithm 120 (e.g., Grover's search algorithm) to determine APIs 136 that correspond to the errors 126. The quantum processor 108 of the code review system 104 initializes qubits 130. In certain embodiments, the quantum processor 108 of the code review system 104 may instruct the converter 112 of the code review system 104 to initialize the qubits 130. The quantum processor 108 of the code review system 104 applies the Hadamard operator to the qubits 130 to generate an initial quantum state 132. The quantum processor 108 of the code review system 104 applies an oracle operator and a diffusion operator to the current quantum state (e.g., initial quantum state 132). In certain embodiments, the oracle operator comprises a Pauli X gate.

The quantum processor 108 of the code review system 104 determines if the oracle and diffusion operators are applied to the initial quantum state 132 for a threshold number 140 of times. In certain embodiments, the oracle and diffusion operators are applied to the initial quantum state 132 one or more times until the oracle and diffusion operators are applied to the initial quantum state 132 for the threshold number 140 of times.

In response to determining that the oracle and diffusion operators are applied to the initial quantum state 132 for the threshold number 140 of times, the quantum processor 108 of the code review system 104 identifies the current quantum state as a final quantum state 134. The quantum processor 108 of the code review system 104 measures the final quantum state 134 to determine APIs 136 that correspond to the errors 126. In certain embodiments, the quantum processor 108 of the code review system 104 instructs the converter 112 to measure the final quantum state 134.

The classical processor 106 of the code review system 104 identifies an application code (e.g., respective one of the plurality of application codes 124) corresponding to each API (e.g., respective one of the APIs 136) and determines a code fix (e.g., respective one of code fixes 138) corresponding to each identifies application code (e.g., respective one of the plurality of application codes 124). The classical processor 106 of the code review system 104 applies code fixes 138 to the identified application codes (e.g., respective ones of the plurality of application codes 124) to generate fixed application codes 142.

The classical processor 106 of the code review system 104 deploys the fixed application codes 142 to a test system 144. The classical processor 106 of the code review system 104 analyzes the fixed application codes 142 and determines if run-time errors 128 are identified. In certain embodiments, the above-described operations may be repeated one or more times until the run-time errors 128 are not identified. In response to determining that the run-time errors 128 are not identified, the classical processor 106 of the code review system 104 deploys the fixed application codes 142 to the service provider systems 156-1 through 156-*m* of the cloud computing system 154.

Cloud Computing System

The cloud computing system 154 may comprise a plurality of service provider systems 156-1 through 156-*m*. The plurality of service provider systems 156-1 through 156-*m* are configured to interact with users and provide various services to the users. Each of the service provider systems 156-1 through 156-*m* is generally any device that is configured to process data and communicate with other components of the system 100 via the network 102. Each of the service provider systems 156-1 through 156-*m* comprises a respective one of processors 158-1 through 158-*m* in signal communication with a respective one of memories 162-1 through 162-*m* and a respective one of network interfaces 160-1 through 160-*m*. Each of the processors 158-1 through 158-*m* may comprise one or more processors operably coupled to a respective one of the memories 162-1 through 162-*m*.

Each of the processors 158-1 through 158-*m* is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 158-1 through 158-*m* may be a programmable logic device, a microcontroller, a microprocessor, or any suitable combination of the preceding. The one or more processors are configured to process data and may be implemented in hardware or software. For example, each of the processors 158-1 through 158-*m* may be 8-bit, 16-bit, 32-bit, 64-bit, or of any other suitable architecture. Each of the processors 158-1 through 158-*m* is configured to implement various software instructions. For example, each of the processors 158-1 through 158-*m* is configured to execute respective ones of software instructions 164-1 through 164-*m* that are stored in a respective one of the memories 162-1 through 162-*m* in order to perform operations described herein. Processors 158-1 through 158-*m* may be also referred to as classical processors.

Each of the network interfaces 160-1 through 160-*m* is configured to enable wired and/or wireless communications (e.g., via network 102). Each of the network interfaces 160-1 through 160-*m* is configured to communicate data between a respective one of the service provider systems 156-1 through 156-*m* and other components of the system 100. For example, each of the network interfaces 160-1 through 160-*m* may comprise a WIFI interface, a local area network (LAN) interface, a wide area network (WAN) interface, a modem, a switch, or a router. Each of the network interfaces 160-1 through 160-*m* may be configured to use any suitable type of communication protocol as would be appreciated by one of ordinary skill in the art.

Each of the memories 162-1 through 162-*m* comprises a non-transitory computer-readable medium such as one or more disks, tape drives, or solid-state drives, and may be used as an over-flow data storage device, to store programs when such programs are selected for execution, and to store instructions and data that are read during program execution. Each of the memories 162-1 through 162-*m* may be volatile or non-volatile and may comprise a read-only memory (ROM), random-access memory (RAM), ternary content-addressable memory (TCAM), dynamic random-access memory (DRAM), and static random-access memory (SRAM). Each of the memories 162-1 through 162-*m* may be implemented using one or more disks, tape drives, solid-state drives, and/or the like. Each of the memories 162-1 through 162-*m* may store any of the information described in FIGS. 1, 2A, and 2B along with any other data, instructions, logic, rules, or code operable to implement the function(s) described herein. Each of the memories 162-1 through 162-*m* is operable to store respective ones of software instructions 164-1 through 164-*m*, and/or any other data and instructions. Each of the software instructions 164-1 through 164-*m* may comprise any suitable set of software instructions, logic, rules, or code operable to be executed by respective one of the processors 158-1 through 158-*m*. Each of the memories 162-1 through 162-*m* may further store respective ones of application codes 166-1 through 166-*m*. In certain embodiments, the processors 158-1 through 158-*m* are configured to execute the application codes 166-1 through 166-*m* and provide services to users.

Test System

The test system 144 is generally any device that is configured to process data and communicate with other components of the system 100 via the network 102. The test system 144 may comprise a processor 146 in signal communication with a memory 150 and a network interface 148.

Processor 146 comprises one or more processors operably coupled to the memory 150. Processor 146 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 146 may be a programmable logic device, a microcontroller, a microprocessor, or any suitable combination of the preceding. The one or more processors are configured to process data and may be implemented in hardware or software. For example, processor 146 may be 8-bit, 16-bit, 32-bit, 64-bit, or of any other suitable architecture. The one or more processors are configured to implement various software instructions to perform the operations described herein. For example, the one or more processors are configured to execute software instructions 152 and perform one or more functions described herein. Processor 146 may be also referred to as a classical processor.

Network interface 148 is configured to enable wired and/or wireless communications (e.g., via network 102). Network interface 148 is configured to communicate data between the test system 144 and other components of the system 100. For example, the network interface 148 may comprise a WIFI interface, a local area network (LAN) interface, a wide area network (WAN) interface, a modem, a switch, or a router. Processor 146 is configured to send and receive data using the network interface 148. Network interface 148 may be configured to use any suitable type of communication protocol as would be appreciated by one of ordinary skill in the art.

The memory 150 comprises a non-transitory computer-readable medium such as one or more disks, tape drives, or solid-state drives, and may be used as an over-flow data storage device, to store programs when such programs are selected for execution, and to store instructions and data that are read during program execution. Memory 150 may be volatile or non-volatile and may comprise a read-only memory (ROM), random-access memory (RAM), ternary content-addressable memory (TCAM), dynamic random-access memory (DRAM), and static random-access memory (SRAM). Memory 150 may be implemented using one or more disks, tape drives, solid-state drives, and/or the like. Memory 150 may store any of the information described in FIGS. 1, 2A, and 2B along with any other data, instructions, logic, rules, or code operable to implement the function(s) described herein. Memory 150 is operable to store software instructions 152 and/or any other data and instructions. The software instructions 152 may comprise any suitable set of software instructions, logic, rules, or code operable to be executed by the processor 146.

In operation, the processor 146 of the test system 144 is configured to receive the fixed application codes 142 from the code review system 104 and execute the fixed application codes 142 in a testing mode.

Example Method for Identifying and Rectifying Application Programing Interface Errors Using Quantum Computing FIGS. 2A and 2B illustrate an example flowchart of a method 200 for identifying and rectifying application programming interface errors using quantum computing. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., software instructions 118 and/or one or more quantum algorithms 120 of FIG. 1), stored on non-transitory, tangible, computer-readable medium (e.g., memory 116 of FIG. 1) that when executed by at least one classical processor (e.g., classical processor 106 of FIG. 1) and at least one quantum processor (e.g., quantum processor 108 of FIG. 1) may cause the at least one classical processor and the at least one quantum processor to perform operations 202-236.

Method 200 starts with operation 202, where a classical processor 106 of a code review system 104 receives a plurality of application codes 124. In certain embodiments, the plurality of application codes 124 are application codes that are to be deployed to service provider systems 156-1 through 156-m of a cloud computing system 154. At operation 204, the classical processor 106 of the code review system 104 analyzes the plurality of application codes 124. At operation 206, the classical processor 106 of the code review system 104 identifies errors 126 in the plurality of application codes 124 based on rules 122. The rules 122 may comprise common rules (e.g., rules that are common across all service provider systems 156-1 through 156-m of the cloud computing system 154), custom rules (e.g., rules that are specific to each of the service provider systems 156-1 through 156-m of the cloud computing system 154), application specific rules (e.g. .NET rules, Mulesoft rules, Salesforce rules, or the like), or the like.

At operation 208, the quantum processor 108 of the code review system 104 implements a quantum algorithm 120 to determine APIs 136 that correspond to the errors 126. In certain embodiments, the quantum algorithm 120 comprises Grover's search algorithm. Operation 208 comprises operations 210 through 222 that performed by the quantum processor 108 of the code review system 104.

At operation 210, the quantum processor 108 of the code review system 104 initializes qubits 130. In certain embodiments, the quantum processor 108 of the code review system 104 may instruct the converter 112 of the code review system 104 to initialize the qubits 130. At operation 212, the quantum processor 108 of the code review system 104 applies the Hadamard operator to the qubits 130 to generate an initial quantum state 132. At operation 214, the quantum processor 108 of the code review system 104 applies an oracle operator to the current quantum state (e.g., initial quantum state 132). In certain embodiments, the oracle operator comprises a Pauli X gate. At operation 216, the quantum processor 108 of the code review system 104 applies a diffusion operator to the current quantum state.

At operation 218, the quantum processor 108 of the code review system 104 determines if the oracle and diffusion operators are applied to the initial quantum state 132 for a threshold number 140 of times. In response to determining at operation 218 that the oracle and diffusion operators are not applied to the initial quantum state 132 for the threshold number 140 of times, method 200 proceeds to operation 214. In certain embodiments, operations 214 through 218 are repeated one or more times (corresponding to one or more iterations) until the oracle and diffusion operators are applied to the initial quantum state 132 for the threshold number 140 of times.

In response to determining at operation 218 that the oracle and diffusion operators are applied to the initial quantum state 132 for the threshold number 140 of times, method 200 proceeds to operation 220. At operation 220, the quantum processor 108 of the code review system 104 identifies the current quantum state as a final quantum state 134. At operation 222, the quantum processor 108 of the code review system 104 measures the final quantum state 134 to determine APIs 136 that correspond to the errors 126. In certain embodiments, the quantum processor 108 of the code review system 104 instructs the converter 112 to measure the final quantum state 134.

At operation 224, the classical processor 106 of the code review system 104 identifies an application code (e.g., respective one of the plurality of application codes 124 of FIG. 1) corresponding to each API (e.g., respective one of the APIs 136 of FIG. 1). At operation 226, the classical processor 106 of the code review system 104 determines a code fix (e.g., respective one of code fixes 138 of FIG. 1) corresponding to each identifies application code (e.g., respective one of the plurality of application codes 124 of FIG. 1). At operation 228, the classical processor 106 of the code review system 104 applies code fixes 138 to the identified application codes (e.g., respective ones of the plurality of application codes 124 of FIG. 1) to generate fixed application codes 142.

At operation 230, the classical processor 106 of the code review system 104 deploys the fixed application codes 142 to a test system 144. At operation 232, the classical processor 106 of the code review system 104 analyzes the fixed application codes 142. At operation 234, the classical processor 106 of the code review system 104 determines if run-time errors 128 are identified. In response to determining at operation 234 that the run-time errors 128 are identified, method 200 proceeds to operation 210. In certain embodiments, operations 210 through 234 are repeated one or more times until the run-time errors 128 are not identified.

In response to determining at operation 234 that the run-time errors 128 are not identified, method 200 proceeds to operation 236. At operation 236, the classical processor 106 of the code review system 104 deploys the fixed application codes 142 to the service provider systems 156-1 through **156-*m* of the cloud computing system 154. After performing operation 236, method 200** proceeds to end.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory configured to store:
a quantum search algorithm; and
a plurality of rules, wherein the plurality of rules are used to identify application programming interface (API) errors;
a classical processor communicatively coupled to the memory, wherein the classical processor is configured to:
analyze codes of a plurality of applications, wherein the plurality of applications are configured to be deployed to a plurality of computing systems;
identify first errors in the codes of the plurality of applications based on the plurality of rules;
receive, from a quantum processor, one or more APIs of the plurality of applications that correspond to the first errors;
identify a first application of the plurality of application corresponding to a first API of the one or more APIs, wherein the first application is configured to be deployed to a first computing system of the plurality of computing systems;
determine a first code fix for a first code of the first application; and
apply the first code fix to the first code of the first application to determine a first fixed code of the first application; and the quantum processor communicatively coupled to the memory, wherein the quantum processor, when implementing the quantum search algorithm, is configured to:
initialize a first plurality of qubits;
generate a first initial quantum state based on the first plurality of qubits;
perform one or more first iterations on the first initial quantum state to determine a first final quantum state, wherein performing an iteration of the one or more first iterations comprises:
applying a first oracle operator to a first current quantum state; and
applying a first diffusion operator to the first current quantum state; and
determine, based on the first final quantum state, the one or more APIs of the plurality of applications that correspond to the first errors.

2. The system of claim 1, wherein the classical processor is further configured to:
deploy the first fixed code of the first application to a test computing system;
analyze the first application;
determine whether first run-time errors are identified for the first application; and
in response to determining that no first run-time errors are identified, deploy the first fixed code of the first application to the first computing system.

3. The system of claim 2, wherein:
the classical processor is further configured to, in response to determining that the first run-time errors are identified:
receive, from the quantum processor, one or more APIs of the first application that correspond to the first run-time errors;
determine a second code fix for the first fixed code of the first application; and
apply the second code fix to the first fixed code of the first application to determine a second fixed code of the first application; and
the quantum processor is further configured to, in response to determining that the first run-time errors are identified:
initialize a second plurality of qubits;
generate a second initial quantum state based on the second plurality of qubits;
perform one or more second iterations on the second initial quantum state to determine a second final quantum state, wherein performing an iteration of the one or more second iterations comprises:
applying a second oracle operator to a second current quantum state; and
applying a second diffusion operator to the second current quantum state; and
determine, based on the second final quantum state, the one or more APIs of the first application that correspond to the first run-time errors.

4. The system of claim 3, wherein the classical processor is further configured to:
deploy the second fixed code of the first application to the test computing system;
analyze the first application;
determine whether second run-time errors are identified for the first application; and
in response to determining that no second run-time errors are identified, deploy the second fixed code of the first application to the first computing system.

5. The system of claim 1, wherein the first oracle operator comprises a Pauli X gate.

6. The system of claim 1, wherein generating the first initial quantum state based on the first plurality of qubits comprises applying a Hadamard operator to the first plurality of qubits.

7. The system of claim 1, wherein determining, based on the first final quantum state, the one or more APIs of the plurality of applications that correspond to the first errors comprises measuring the first final quantum state.

8. A method comprising:

analyzing codes of a plurality of applications, wherein the plurality of applications are configured to be deployed to a plurality of computing systems;

identifying first errors in the codes of the plurality of applications based on a plurality of rules, wherein the plurality of rules are used to identify application programming interface (API) errors in the codes of the plurality of applications;

initializing a first plurality of qubits;

generating a first initial quantum state based on the first plurality of qubits;

performing one or more first iterations on the first initial quantum state to determine a first final quantum state, wherein performing an iteration of the one or more first iteration comprises:

applying a first oracle operator to a first current quantum state; and applying a first diffusion operator to the first current quantum state;

determining, based on the first final quantum state, one or more APIs of the plurality of applications that correspond to the first errors;

identifying a first application of the plurality of applications corresponding to a first API of the one or more APIs, wherein the first application is configured to be deployed to a first computing system of the plurality of computing systems;

determining a first code fix for a first code of the first application; and applying the first code fix to the first code of the first application to determine a first fixed code of the first application.

9. The method of claim 8, further comprising:

deploying the first fixed code of the first application to a test computing system;

analyzing the first application;

determining whether first run-time errors are identified for the first application; and in response to determining that no first run-time errors are identified, deploying the first fixed code of the first application to the first computing system.

10. The method of claim 9, further comprising, in response to determining that the first run-time errors are identified:

initializing a second plurality of qubits;

generating a second initial quantum state based on the second plurality of qubits;

performing one or more second iterations on the second initial quantum state to determine a second final quantum state, wherein performing an iteration of the one or more second iterations comprises:

applying a second oracle operator to a second current quantum state; and applying a second diffusion operator to the second current quantum state;

determining, based on the second final quantum state, the one or more APIs of the first application that correspond to the first run-time errors;

determining a second code fix for the first fixed code of the first application; and applying the second code fix to the first fixed code of the first application to determine a second fixed code of the first application.

11. The method of claim 10, further comprising:

deploying the second fixed code of the first application to the test computing system;

analyzing the first application;

determining whether second run-time errors are identified for the first application; and in response to determining that no second run-time errors are identified, deploying the second fixed code of the first application to the first computing system.

12. The method of claim 8, wherein the first oracle operator comprises a Pauli X gate.

13. The method of claim 8, wherein generating the first initial quantum state based on the first plurality of qubits comprises applying a Hadamard operator to the first plurality of qubits.

14. The method of claim 8, wherein determining, based on the first final quantum state, the one or more APIs of the plurality of applications that correspond to the first errors comprises measuring the first final quantum state.

15. A non-transitory computer-readable medium storing instructions that, when executed by at least one of a classical processor or a quantum processor, cause the at least one of the classical processor or the quantum processor to:

analyze codes of a plurality of applications, wherein the plurality of applications are configured to be deployed to a plurality of computing systems;

identify first errors in the codes of the plurality of applications based on a plurality of rules, wherein the plurality of rules are used to identify application programming interface (API) errors in the codes of the plurality of applications;

initialize a first plurality of qubits;

generate a first initial quantum state based on the first plurality of qubits;

perform one or more first iterations on the first initial quantum state to determine a first final quantum state, wherein performing an iteration of the one or more first iterations comprises:

applying a first oracle operator to a first current quantum state; and applying a first diffusion operator to the first current quantum state;

determine, based on the first final quantum state, one or more APIs of the plurality of applications that correspond to the first errors;

identify a first application of the plurality of applications corresponding to a first API of the one or more APIs, wherein the first application is configured to be deployed to a first computing system of the plurality of computing systems;

determine a first code fix for a first code of the first application; and apply the first code fix to the first code of the first application to determine a first fixed code of the first application.

16. The non-transitory computer-readable medium of claim 15, wherein the instructions, when executed by the at least one of the classical processor or the quantum processor, further cause the at least one of the classical processor or the quantum processor to:

deploy the first fixed code of the first application to a test computing system;

analyze the first application;

determine whether first run-time errors are identified for the first application; and in response to determining that no first run-time errors are identified, deploy the first fixed code of the first application to the first computing system.

17. The non-transitory computer-readable medium of claim 16, wherein the instructions, when executed by the at least one of the classical processor or the quantum processor, further cause the at least one of the classical processor or the quantum processor to, in response to determining that the first run-time errors are identified:

initialize a second plurality of qubits;

generate a second initial quantum state based on the second plurality of qubits;

perform one or more second iterations on the second initial quantum state to determine a second final quantum state, wherein performing an iteration of the one or more second iterations comprises:

applying a second oracle operator to a second current quantum state; and applying a second diffusion operator to the second current quantum state;

determine, based on the second final quantum state, the one or more APIs of the first application that correspond to the first run-time errors;

determine a second code fix for the first fixed code of the first application; and apply the second code fix to the first fixed code of the first application to determine a second fixed code of the first application.

18. The non-transitory computer-readable medium of claim 17, wherein the instructions, when executed by the at least one of the classical processor or the quantum processor, further cause the at least one of the classical processor or the quantum processor to:

deploy the second fixed code of the first application to the test computing system;

analyze the first application;

determine whether second run-time errors are identified for the first application; and in response to determining that no second run-time errors are identified, deploy the second fixed code of the first application to the first computing system.

19. The non-transitory computer-readable medium of claim 15, wherein the first oracle operator comprises a Pauli X gate.

20. The non-transitory computer-readable medium of claim 15, wherein generating the first initial quantum state based on the first plurality of qubits comprises applying a Hadamard operator to the first plurality of qubits.

\* \* \* \* \*